United States Patent [19]
Kuwahara et al.

[11] Patent Number: 5,483,456
[45] Date of Patent: Jan. 9, 1996

[54] NAVIGATION SYSTEM AND A METHOD OF CALCULATING GPS MEASURING DEVIATION

[75] Inventors: Shingo Kuwahara; Satoshi Odagawa, both of Kawagoe, Japan

[73] Assignee: Pioneer Electronic Corporation, Tokyo, Japan

[21] Appl. No.: 144,535

[22] Filed: Nov. 2, 1993

[30] Foreign Application Priority Data

Nov. 4, 1992 [JP] Japan .................................. 4-294969

[51] Int. Cl.⁶ .................................................. G06F 165/00
[52] U.S. Cl. ........................ 364/449; 340/990; 340/995; 342/357; 342/457
[58] Field of Search .................................. 364/443, 444, 364/449, 453, 454, 459; 340/988, 990, 995; 73/178 R; 342/357, 457, 451

[56] References Cited

U.S. PATENT DOCUMENTS

| | | | |
|---|---|---|---|
| 4,899,285 | 2/1990 | Nakayama et al. | 364/449 |
| 4,928,107 | 5/1990 | Kuroda et al. | 342/357 |
| 4,949,268 | 8/1990 | Nishikawa et al. | 342/357 |
| 5,276,451 | 1/1994 | Odagawa | 342/457 |
| 5,293,318 | 3/1994 | Fukushima | 364/449 |
| 5,311,195 | 5/1994 | Mathis et al. | 342/357 |
| 5,323,163 | 6/1994 | Maki | 342/357 |

FOREIGN PATENT DOCUMENTS

| | | |
|---|---|---|
| 0393935 | 10/1990 | European Pat. Off. . |
| 62-073116 | 4/1987 | Japan . |
| 1-109276 | 4/1989 | Japan . |
| 3-291583 | 12/1991 | Japan . |

*Primary Examiner*—Gary Chin
*Attorney, Agent, or Firm*—Young & Thompson

[57] ABSTRACT

A navigation system includes: GPS receiving device for receiving satellite information including accuracy information supplied from a plurality of GPS satellites and outputting at least the accuracy information, a measuring position as a receiving point calculated from the satellite information, and a declining rate of measuring accuracy calculated on the basis of the position of the GPS satellites; deviation calculating device for calculating a GPS measuring deviation by using the accuracy information and the declining rate of the measuring accuracy; map information storing device for storing map information including digitalized road information; and current position estimating device for estimating a current position by searching the road information within the radius of the GPS measuring deviation around the measured position.

8 Claims, 4 Drawing Sheets

NAVIGATION SYSTEM AND A METHOD OF CALCULATING GPS MEASURING DEVIATION

BACKGROUND OF THE INVENTION

1. Field of the Invention

The present invention generally relates to a navigation system which supports driving of a movable body such as a car or the like by displaying the current position and the traveling direction of the movable body, and more particularly to a navigation system which includes a GPS (Global Positioning System) receiver, and which amends a position measured by the GPS receiver by using a map matching and calculates the current position with high accuracy.

2. Description of the Related Art

A navigation system installed for example in an vehicle and the like is required to measure the self vehicle position and the traveling direction, and then to exactly and quickly display information to the driver on a display unit, which information include a map information corresponding to the self vehicle position i.e. the current position, guide marks indicating the current position and the traveling direction, and the other information required by the user. As a position measuring device, there are two types of navigation systems. One is a GPS type navigation system which receives the electric waves from the satellites and calculates the current position. The other is a self-sustaining navigation system which calculates the current position by using the data from an angular velocity sensor such as a gyro, an azimuth sensor such as a geomagnetic sensor, and a mileage sensor for detecting a mileage. The GPS system is extremely useful, since setting the self vehicle position on the map is not needed and since an error in the position measuring is not accumulated, therefore high reliability is obtained.

The navigation system which displays the current position by using the GPS system includes map data including digitized road information, and carries out a map matching, which estimate the accurate position by using the data. The conventional map matching includes the steps of setting a predetermined deviation area, in which the measuring position would exist, around the measuring position, detecting roads by searching the road information in the deviation area, selecting the road which satisfies the requirements by calculating the distances from the measuring position to each detected road, and moving the current position on the map. The deviation area around the measuring position is experientially calculated and predetermined.

However, the detecting of the conventional map matching was carried out by searching the road information in the predetermined deviation area. Therefore when the measuring accuracy which changes according to various circumstances or driving condition was extremely low, the road which would have included the current position was located out of the predetermined deviation area and the accuracy in estimating the current position became low. On the other hand, when the measuring accuracy had increased, the road which would have not included the current position was located within the predetermined deviation area and was searched. Therefore, a burden for the calculation had increased.

SUMMARY OF THE INVENTION

Accordingly, an object of the present invention is to provide a navigation system which can enhance the accuracy in estimating the current position on the map matching and can decrease the burden.

According to one aspect of the invention, there is provided a navigation system including: GPS receiving device for receiving satellite information including accuracy information supplied from a plurality of GPS satellites and outputting at least the accuracy information, a measuring position as a receiving point calculated from the satellite information, and a declining rate of measuring accuracy calculated on the basis of the positions of the GPS satellites; deviation calculating device for calculating a GPS measuring deviation by using the accuracy information and the declining rate of the measuring accuracy; map information storing device for storing map information including digitalized road information; and current position estimating device for estimating a current position by searching the road information within a circle around the measured position having a radius equal to the GPS measuring deviation.

According to another aspect of the invention, there is provided a method of calculating GPS measuring deviation obtained by a deviation calculating device which calculates the GPS measuring deviation from accuracy information and a declining rate of measuring accuracy, the method including steps of: detecting whether GPS satellite information is obtained or not; obtaining accuracy information of each captured satellites; obtaining a declining rate of measuring accuracy; detecting whether the measuring dimension is two or three; obtaining the maximum URA (User Range Accuracy) value of those of three satellites and using the maximum value as the satellites, if the two measuring dimension is detected; calculating GPS measuring deviation; and storing the GPS measuring deviation.

The current GPS measuring method by using information from GPS satellites includes the steps of calculating the position of satellites by using the broadcasted orbit information of satellites included in navigation messages as satellite information supplied from satellites, and calculating the current position. Generally, the orbit information includes deviation due to the decline of satellite information accuracy(SA) which is intentionally controlled by the earth station. The information indicating the accuracy is simultaneously supplied from satellites. The accuracy information is defined by the value of URA and is received as the information indicating the deviation level of each satellite. The unit of the URA is m (meter). Further, after calculating the position of satellites, the decline rate of the accuracy due to the position of satellites is calculated. Regarding the GPS navigation system, the terms "PDOP (Position Dilution Of Precision)" and "HDOP (Horizontal DOP)" etc. are defined and are used as standard which indicates the measuring accuracy due to the position of satellites. PDOP is the declining rate of accuracy on three dimensional measuring when the current position is calculated on capturing four satellites, and HDOP is the declining rate of accuracy on two dimensional measuring, which makes the positioning on a horizontal plane, when the current position is calculated on capturing three satellites. For example, if more than four satellites are captured, the value of PDOP is used as standard to select the appropriate four satellites from them.

The operation process of the navigation system according to the present invention includes the steps of calculating the GPS measuring deviation from the accuracy information received from such GPS satellites and the declining rate of accuracy calculated by using the position of satellites, performing the map matching by searching road information within the radius of the GPS measuring deviation around the measuring position, and estimating the current position. Therefore, if the measuring accuracy is high, the search area becomes narrow. The number of road information calculated in the operation process decreased and the burden of the calculation process is decreased. On the other hand, if the measuring accuracy is low, the search area becomes broad and the accuracy of the current position to be estimated can be enhanced.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

A preferred embodiment according to the present invention will now be described below with reference to the accompanying drawings.

Figure 1:
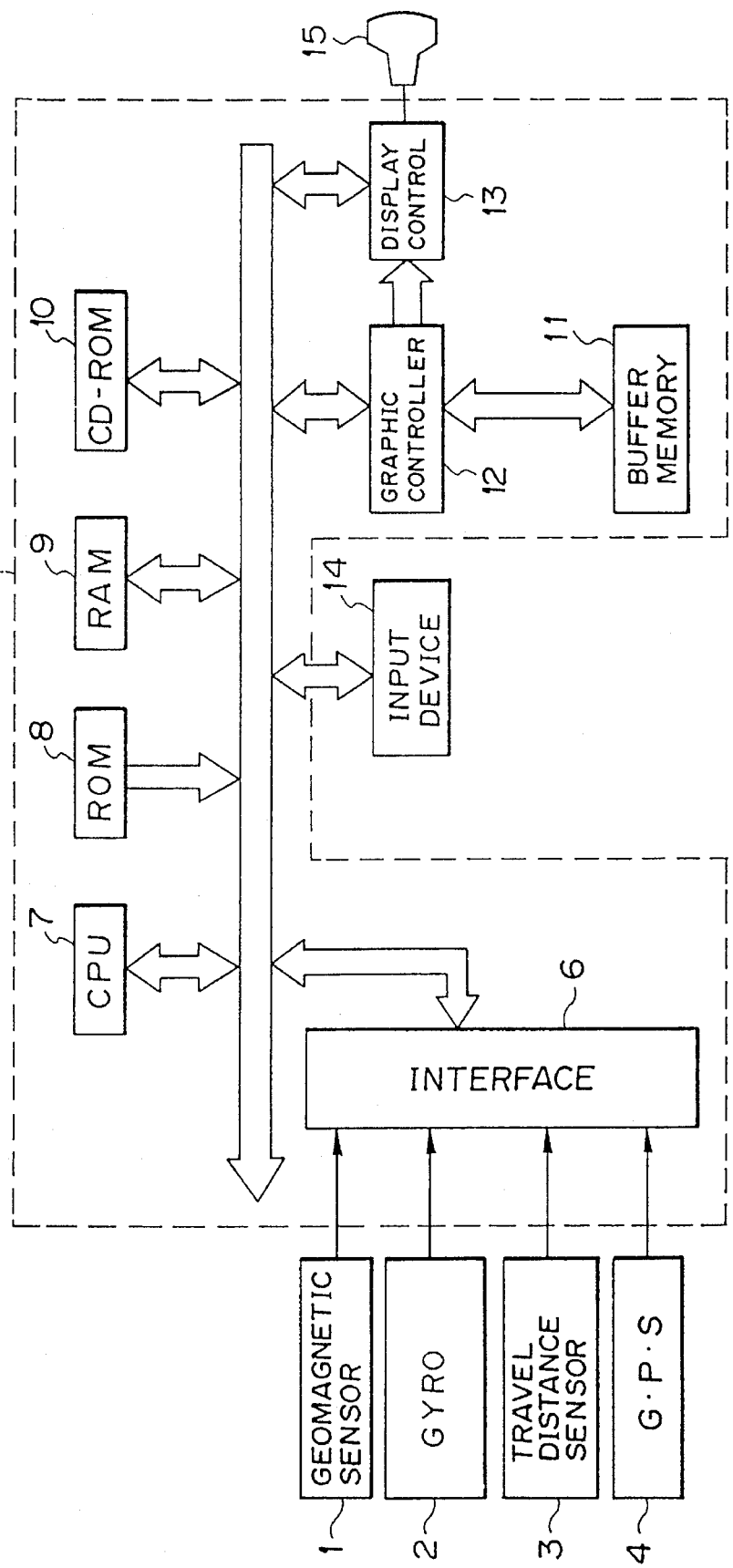
FIG. 1 is a block diagram of an embodiment of a navigation system installed in an vehicle according to the present invention.

FIG. 1 is a block diagram showing an embodiment of a navigation system installed in an vehicle according to the present invention. As shown in FIG. 1, the navigation system includes a geomagnetic sensor 1 for outputting a direction data of the vehicle on the basis of geomagnetism (earth magnetism), a gyro 2 for detecting an angular velocity according to the variation of the direction data and outputting the angular velocity data, a travel distance sensor 3 for detecting whether the vehicle is running or stopped and outputting the status of the vehicle and the data of a speed and a travel distance of the vehicle, a GPS receiver 4 for receiving electric waves from a plurality of GPS satellites to calculate and output GPS data of latitude, longitude, altitude and travel direction of the vehicle, URA, PDOP, HDOP, etc., a system controller 5 for executing various processing such as calculation, control, etc., an input device 14 for inputting various instructions into the system controller 5, and a display 15 such as a liquid crystal display, a CRT or the like.

The system controller 5 includes an interface 6 for receiving the output signals from the geometric sensor 1, the travel distance sensor 3 and the GPS receiver 4 and subjecting these output signals to A/D conversion, a CPU (Central Processing Unit) 7 for carrying out various calculations and controls in accordance with processing programs, a ROM (Read Only Memory) 8 in which various processing programs and other necessary information are beforehand stored, a RAM (Random Access Memory) 9 in and from which information required to execute the programs are written and read, a recording medium 10 such as a CD-ROM, an IC card or the like in which digitized map information, etc. are recorded, a buffer memory 11 such as a V-RAM (video RAM) or the like for temporarily storing, as a frame buffer, an image information to be directly displayed, a graphic controller 12 for inputting graphic data such as map information into the buffer memory 11 and outputting the data stored in the buffer memory 11 as image information in response to the instruction from the CPU 7, and a display control circuit 13 for receiving the image information output from the graphic controller 12 and controlling an image display operation of the display 15 on the basis of the received image information.

Figure 2:
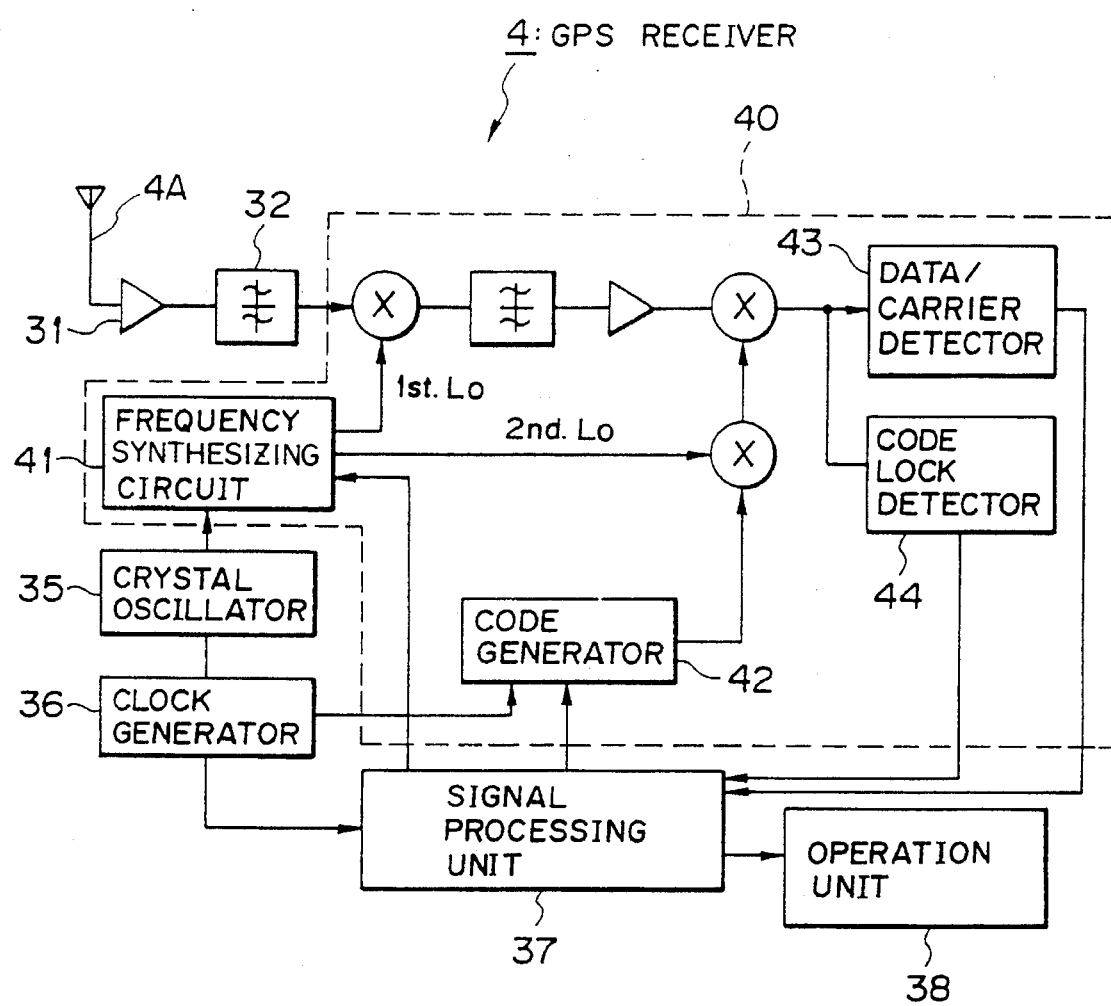
FIG. 2 is a block diagram of an embodiment of a GPS receiver.

FIG. 2 shows a block diagram of the GPS receiver 4.

As shown in FIG. 2, the GPS receiver 4 includes the following components. A description will now be given of the GPS receiver 4 with reference to FIG. 2. A GPS antenna 4A is coupled to a GPS receiving block 40 via a preamplifier 31 and a band-pass filter 32. A crystal oscillator 35 generates a reference frequency signal, which is a reference timing control signal of the GPS receiver 4. A clock generator 36 generates, from the reference frequency signal, a clock signal for controlling the operation timing of a signal processing unit 37. An operation unit 38 generates GPS data on the basis of the output signal generated by the signal processing unit 37. The GPS receiving block 40 includes the following components. A frequency synthesizing circuit 41 generates a signal having the same pattern as data relating to a carrier of the GPS satellite, the position thereof, and a clock built in the GPS satellite on the basis of the reference frequency signal. A code generator 42 receives the clock signal generated by the clock generator 36, and generates a code signal having the same pattern as a distance measurement signal. A data/carrier detector 43 synchronously detects, by using the output signals of the frequency mixing circuit 41 and the code generator 42, data relating to the clock built in the GPS satellite and an orbit of the GPS satellite, and the carrier. A code lock detector 44 synchronously detects the above-mentioned distance measurement signal by using the code signal generated by the code generator 42.

The GPS data generated by the operation unit 38 include the data of latitude, longitude, altitude, and travel direction of the vehicle, URA information which are accuracy information of each satellite captured for the purpose of calculation of the current position, and PDOP which is the declining rate of accuracy on three dimensional measuring when the current position is calculated on capturing four satellites or HDOP which is the declining rate of accuracy on two dimensional measuring when the current position is calculated on capturing three satellites. These GPS data are supplied via the interface 6 to the system controller 5.

When the navigation device thus constructed is activated, the system controller 5 reads out information for access of the map display information and a display information for the vehicle position mark, etc. from the recording medium 10, and then stores these information into the RAM 9. Subsequently, the system controller 5 reads out latitude/longitude data corresponding to vehicle position information and travel direction information of the vehicle through the GPS receiver 4, and reads out the map information corresponding to the obtained vehicle position from the recording medium 10. The read-out map information is fed to the graphic controller 12 to be displayed as the current position map on the display 15. In addition, the system controller 5 displays the vehicle position mark on the map on the basis of the vehicle position information and the travel direction information. Subsequently, the vehicle position information and the travel direction information are periodically obtained from the GPS receiver 4, and the map matching for searching the current position are periodically carried out to renew the vehicle position by searching the more accurate current position. From these information, the display position, direction of the vehicle position mark, and the display map are renewed if necessary. Further, the output data from the geomagnetic sensor 1, the gyro 2 and the travel distance sensor 3 are periodically read out and then subjected to a predetermined calculation to produce the vehicle position and the travel direction of the vehicle. After comparing the thus calculated information with the information obtained from the GPS measurement device 4, a correction is carried out to reduce the deviation (error) between these information.

Figure 3:
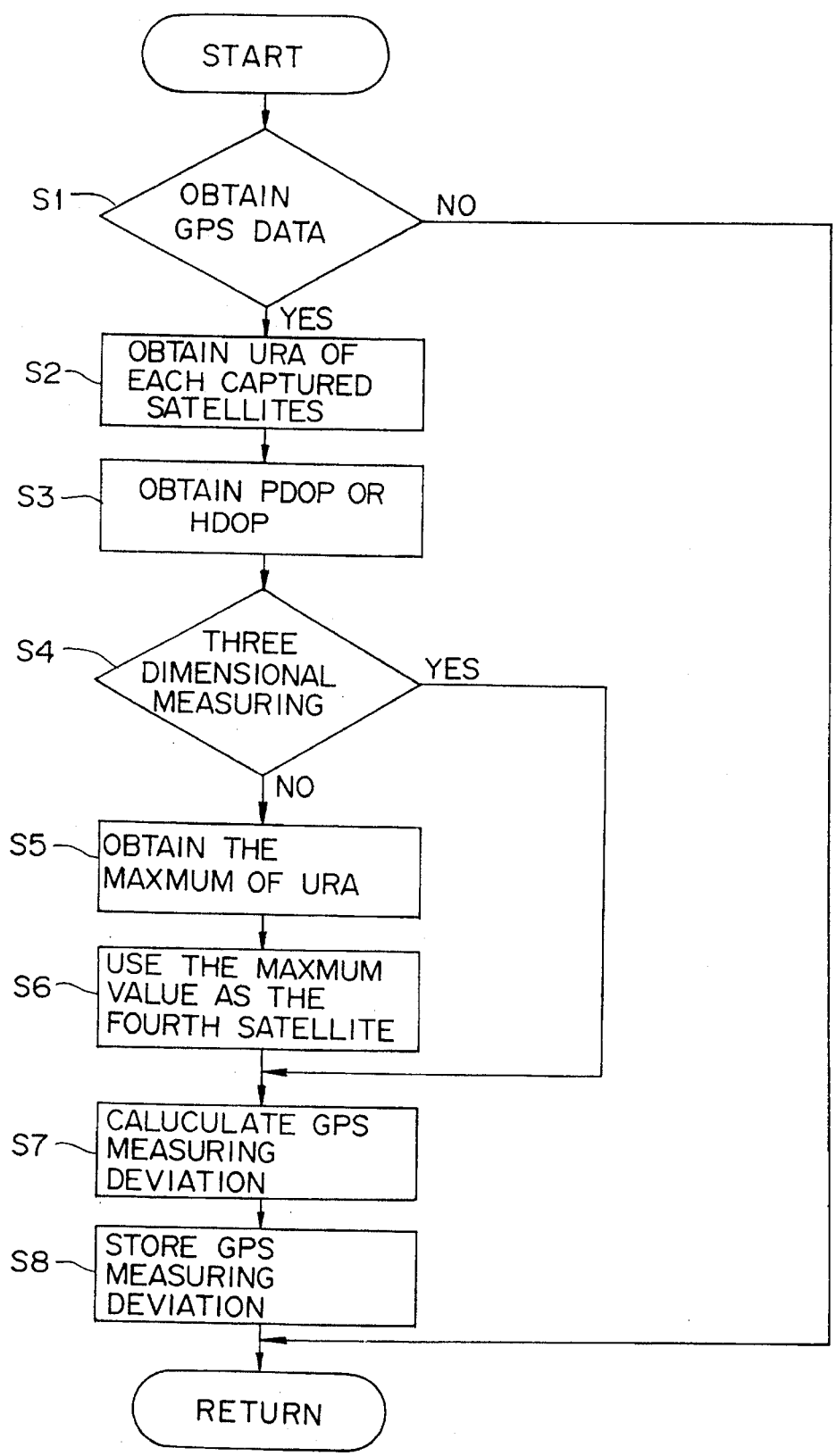
FIG. 3 is a flowchart showing steps of calculating a measuring error.

On receiving the measuring position from the GPS receiver 4, the system controller 5, as device for calculating the deviation, calculates GPS measuring deviation. FIG. 3 shows a flowchart of steps of calculating the deviation. As shown in the flowchart, if the GPS receiver 4 receives the data and calculates the measuring position, the system controller 5 obtains, from the GPS receiver 4, URA values of each satellites captured, and PDOP or HDOP value as the declining rate of accuracy (steps S1–S3). Subsequently, the system controller 5 judges whether the measuring is three dimensional or not. If it is three dimensional measuring, the system controller 5 calculates the measuring GPS deviation L(m) according to the following equation (steps S4,S7).

$$L = PDOP \times \sqrt{\Sigma(URAi)^2} \quad (i = 1 \text{ to } 4) \tag{A}$$

For example, if all of URA values of each satellites are 32.0 and the value of PDOP is 3, the GPS measuring deviation is calculated as follows;

$$L = 3 \times \sqrt{32.0^2 \times 4} = 192m$$

If the position measuring by the GPS receiver 4 is two dimensional, by using the maximum value of the URA values of three satellites as the URA value of the fourth satellite, the GPS measuring deviation L(m) is calculated according to the following equation (steps S5–S7).

$$L = HDOP \times \sqrt{\Sigma(URAi)^2} \quad (i = 1 \text{ to } 4)$$

In the case of two dimensional measuring, the URA value of fourth satellite is not obtained, since information from three satellites are obtained alone. Therefore, if the calculation is performed according to the above equation (A), the value of L is smaller than that of three dimensional measuring and the road including the accurate current position would be out of the deviation area. Therefore, in the case of two dimensional measuring, the fourth satellite is assumed. By using the maximum of three URA values as the URA value of the fourth satellite, the measuring deviation is calculated according to the above equation (A). Therefore, the GPS measuring deviation of two dimensional measuring is almost equivalent to that of three dimensional measuring, and can be used for the calculation as well as that of three dimensional measuring.

The value of the GPS measuring deviation L which is calculated by the above equation (A) is stored (step S8). Each time the measuring calculation is carried out by the GPS receiver 4, the process for calculating said GPS measuring deviation is performed, and the GPS measuring deviation is renewed and stored.

Figure 4:
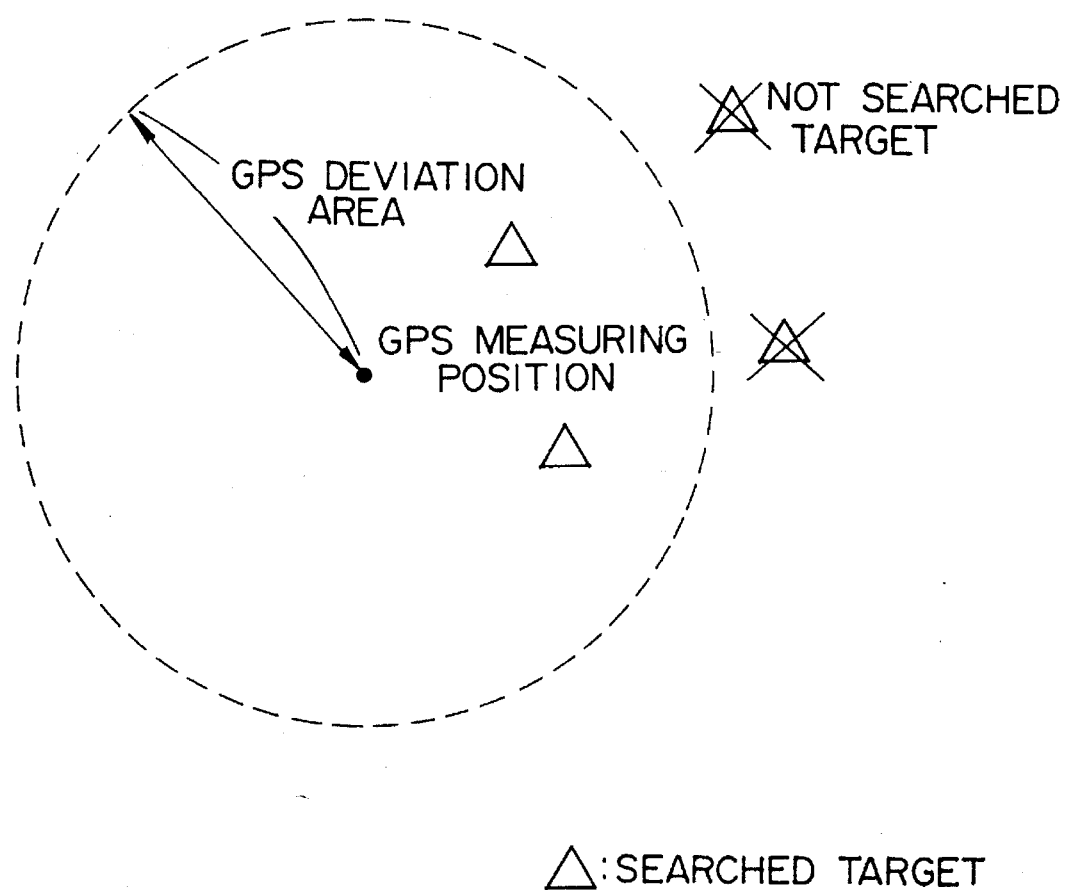
FIG. 4 is a diagram showing a searching area of a map matching.

The GPS measuring deviation L calculated by the process is used to perform the map matching. The process of the map matching includes the step of searching road information within a circle around the measured position obtained by the GPS receiver, 4 having a radius equal to the GPS measuring deviation L. As is shown in FIG. 4, the area outside the radius is not searched.

Therefore, the GPS measuring deviation L changes according to the measuring condition of the GPS receiver 4. If the measuring accuracy is high, the search area becomes narrow and the road which does not include the current position is not searched and the burden of the calculation on the system controller 5 is decreased. On the other hand, if the measuring accuracy is low, the searching area on the map matching becomes broad and then the probability that the road including the current position is outside of the searching area becomes low. The measuring accuracy can therefore be enhanced.

As described above, according to the navigation system of the present embodiment, the searching area for the map matching is changed on the basis of the position of satellites and the measuring deviation due to the decline of the satellite information accuracy, which is intentionally controlled by the earth station. Therefore, the probability that the road not including the current position is outside of the searching area becomes low and the burden of the calculation can be decreased. On the other hand, the probability that the road including the current position is outside of the searching area becomes low. The measuring accuracy can be enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation system comprising:
   GPS receiving means for receiving satellite information including accuracy information supplied from a plurality of GPS satellites and outputting at least said accuracy information, a measuring position calculated from the satellite information, and a declining rate of measuring accuracy calculated on the basis of the positions of the GPS satellites;
   deviation calculating means for calculating a GPS measuring deviation by using the accuracy information and the declining rate of measuring accuracy;
   map information storing means for storing map information including digitized road information; and
   current position estimating means for estimating a current position by searching the road information within the radius of the GPS measuring deviation around the measured position.

2. A navigation system as claimed in claim 1, wherein the navigation system further comprises:
   deviation storing means for storing the GPS measuring deviation obtained by the deviation calculating means.

3. A navigation system as claimed in claim 2, wherein said stored GPS measuring deviation is renewed, each time said deviation calculating means calculates said GPS measuring deviation.

4. A navigation system as claimed in claim 3, wherein the navigation system further comprises:
   measuring dimension detecting means for detecting whether the measuring dimension is two or three dimensional, and wherein if the three dimension measuring is detected, said deviation calculating means calculates the GPS measuring deviation according to the following equation:

$$L = PDOP \times \sqrt{\Sigma(URAi)^2} \quad (i = 1 \text{ to } 4) \quad (A)$$

wherein PDOP is the declining rate of the measuring accuracy on three dimensional measuring and the values of URAi (i=1 to 4, i: integer) are each accuracy information of four satellites.

5. A navigation system as claimed in claim 3, wherein the navigation system further comprises:

measuring dimension detecting means for detecting whether the measuring dimension is two or three dimensional, and wherein if the two dimension measuring is detected, said deviation calculating means calculates the GPS measuring deviation according to the following equation:

$$L = HDOP \times \sqrt{\Sigma(URAi)^2} \quad (i = 1 \text{ to } 4)$$

wherein (i=1 to 4, i: integer) and wherein HDOP is the declining rate of the measuring accuracy on two dimensional measuring and wherein URA(1), URA(2), URA(3) are each accuracy information of three satellites, URA(4) being equal to a greater of URA(1), URA(2) and URA(3).

6. A method of determining a current position of a self-movable body by map-matching in reliance on GPS satellite accuracy information and a declining rate of measuring accuracy supplied from a plurality of GPS satellites, the method comprising steps of:

detecting whether GPS satellite information is obtained;

obtaining said accuracy information of each captured satellites;

obtaining said declining rate of measuring accuracy;

detecting whether a measuring dimension is two or three;

obtaining URA values from three satellites and obtaining a maximum URA value of the three satellites and using the maximum URA value as a URA of a fourth satellite, if the two measuring dimension is detected;

calculating the GPS measuring deviation from said declining rate of measuring accuracy, said URA values of said three satellites and said maximum URA value; and storing the calculated GPS measuring deviation;

performing map-matching by searching only road information within a radius around a current measuring position, said radius being equal to said stored GPS measuring deviation, thereby reducing a searching area in said map-matching step when said GPS measuring deviation is low and increasing said searching area when said GPS measuring deviation is high;

determining an updated current measuring position from within said radius.

7. A method according to claim 6, wherein if the three dimension measuring is detected, the GPS measuring deviation is calculated according to the following equation:

$$L = PDOP \times \sqrt{\Sigma(URAi)^2} \quad (i = 1 \text{ to } 4) \quad (A)$$

wherein PDOP is the declining rate of the measuring accuracy on three dimensional measuring and the values of URAi (i=1 to 4, integer) are each accuracy information of four satellites.

8. A method according to claim 6, wherein if the two dimension measuring is detected, the GPS measuring deviation is calculated according to the following equation:

$$L = HDOP \times \sqrt{\Sigma(URAi)^2} \quad (i = 1 \text{ to } 4)$$

wherein (i=1 to 4, i: integer) and wherein HDOP is the declining rate of the measuring accuracy on two dimensional measuring and wherein URA(1), URA(2), URA(3) are each accuracy information of three satellites, URA (4) being a greater of URA(1), URA(2) and URA(3).

* * * * *